(12) United States Patent
Lewis et al.

(10) Patent No.: US 11,443,442 B2
(45) Date of Patent: Sep. 13, 2022

(54) METHOD AND APPARATUS FOR LOCALIZING A DATA SET BASED UPON SYNTHETIC IMAGE REGISTRATION

(71) Applicant: HERE Global B.V., Eindhoven (NL)

(72) Inventors: Andrew Philip Lewis, Berkeley, CA (US); Stacey Matthew Mott, Waterville, NY (US)

(73) Assignee: HERE GLOBAL B.V., Eindhoven (NL)

(*) Notice: Subject to any disclaimer, the term of this patent is extended or adjusted under 35 U.S.C. 154(b) by 220 days.

(21) Appl. No.: 16/774,065

(22) Filed: Jan. 28, 2020

(65) Prior Publication Data
US 2021/0233208 A1 Jul. 29, 2021

(51) Int. Cl.
G06T 7/00 (2017.01)
G06T 7/33 (2017.01)
G06T 7/32 (2017.01)

(52) U.S. Cl.
CPC ............... G06T 7/33 (2017.01); G06T 7/32 (2017.01); G06T 2207/30252 (2013.01)

(58) Field of Classification Search
CPC ... G06T 7/33; G06T 7/32; G06T 2207/30252; G01C 21/32
See application file for complete search history.

(56) References Cited

U.S. PATENT DOCUMENTS

| 6,249,616 | B1 | 6/2001 | Hashimoto |
| 8,090,218 | B2 | 1/2012 | Larkin et al. |
| 8,938,130 | B2 | 1/2015 | Moate et al. |
| 2015/0193963 | A1* | 7/2015 | Chen ............... G06V 20/13 345/426 |
| 2016/0217577 | A1 | 7/2016 | Tom et al. |
| 2019/0266418 | A1* | 8/2019 | Xu ............... G06K 9/4604 |

(Continued)

FOREIGN PATENT DOCUMENTS

| JP | 3468182 B2 | 11/2003 | |
| WO | WO-2016026870 A1 * | 2/2016 | ....... H04N 5/232939 |
| WO | WO 2019/141992 A1 | 7/2019 | |

OTHER PUBLICATIONS

Jiang et al, Phase Correlation-based Matching Method with Subpixel Accuracy for Translated and Rotated Images, ICSP'02 Proceedings, pp. 752-755 (Year: 2002).*

(Continued)

Primary Examiner — Nancy Bitar
Assistant Examiner — Xiao Liu
(74) Attorney, Agent, or Firm — Alston & Bird LLP

(57) ABSTRACT

A method, apparatus and computer program product are provided to localize data from at least one of two or more data sets a based upon the registration of synthetic images representative of the two or more data sets. In the context of a method, first and second synthetic images are created from first and second data sets, respectively. In creating the first and second synthetic images, representations of one or more features from the first and second data sets are rasterized. The method also determines a transformation based upon a phase correlation between the first and second synthetic images. The transformation provides for improved localization of the data from at least one of the first or second data sets. The method also generates a report that defines the transformation.

18 Claims, 3 Drawing Sheets

(56) References Cited

U.S. PATENT DOCUMENTS

2019/0311205 A1 10/2019 Mittal et al.
2021/0150757 A1* 5/2021 Mustikovela ........ G06K 9/3208

OTHER PUBLICATIONS

Dong, Y. et al., An Extension of Phase Correlation-Based Image Registration to Estimate Similarity Transform Using Multiple Polar Fourier Transform, Remote Sens. 10 (2018) 26 pages.

Jaud, M. et al., Methods doe FMCW Radar Map Georeferencing, ISPRS Journal of Photogrammetry and Remote sensing 84 (2031) 33-42, 17 pages.

Yan, H. et al., Robust Phase Correlation Based Feature Matching For Image Co-Registration and Dem Generation, the International Archives of the Photogrammetry, Remote Sensing and Spatial Information Sciences, vol. XXXVII, Part B7, Beijing (2008) 1751-1756.

Phase correlation—Wikipedia [online] [retrieved Mar. 4, 2020]. Retrieved via the Internet: https://web.archive.org/web/20181109082726/https://en.wikipedia.org/wikie/Phase_correlation (dated Nov. 9, 2018) 5 pages.

Extended European Search Report for European Application No. 21153749.3 dated Jun. 9, 2021, 10 pages.

Duraisamy et al., "A Comparison of Image Registration Techniques for Joining Sequential Images", 2011 International Conference on Wireless Communications and Signal Processing (WCSP), (Nov. 9-11, 2011), 6 pages.

* cited by examiner

METHOD AND APPARATUS FOR LOCALIZING A DATA SET BASED UPON SYNTHETIC IMAGE REGISTRATION

TECHNOLOGICAL FIELD

A method, apparatus and computer program product are provided in accordance with an example embodiment in order to localize data from at least one of two or more data sets and, more particularly, to a method, apparatus and computer program product for localizing data based upon the registration of synthetic images representative of the two or more data sets.

BACKGROUND

Drive data may be based, for example, upon images captured by one or more cameras on board a vehicle and/or other data collected by one or more sensors on board the vehicle as the vehicle drives along a route. The drive data may not include the images themselves, but data derived from the images, such as the locations of various features including point features, e.g., signs and poles, and linear features, e.g., lane markings and road boundaries, on or along the portion of the road network over which the vehicle travels. Drive data may be processed in order to create a map or to identify changes relative to a preexisting map.

Typically, the location of these features relative to the vehicle carrying the camera or other sensors that collected the drive data has been accurately estimated, such as to within a few centimeters. Thus, the relative error between the locations of the features is typically fairly small. However, the positional accuracy of the features identified by the drive data is limited by the accuracy associated with the location of the vehicle, such as may be defined by a global positioning system (GPS), which may have errors on the order of one or more meters.

In order to more accurately define the location of the features identified by drive data, the features identified by one set of drive data may be matched to corresponding features from another set of drive data and/or to corresponding features identified by a map. By matching the features from the drive data to corresponding features from another set of drive data, the features may be aggregated and the resulting location of the features may be defined more accurately, thereby facilitating creation of a map including the features. Alternatively, the matching of the features defined by the drive data to a preexisting map permits changes in the features from those identified by the map to be identified.

In order to match the features from the drive data with features from another set of drive data or with features from a map, correspondences are typically identified between features from the drive data and features from the other data set or from the map. By way of example, each sign identified from the drive data is matched to the closest sign from the other data set or the closest sign from the map. This process of identifying correspondences is similarly performed for every pole, lane marking, road boundary and other feature identified from the drive data. A transformation between the drive data and the other set of drive data or the map data is then performed in order to align the drive data with the other set of drive data or the map data by minimizing the least squares error between the corresponding features of the drive data and the other set of drive data or the map data. In this regard, the iterative closest point algorithm may be utilized to iterate this process of finding correspondences and an optimal transformation between the features until the transformation converges to a stable solution.

However, this approach may be limited in that it is not known a priori whether the features that are identified to be corresponding are correct. For example, in some instances, a feature present in the drive data will not be present in another set of drive data or in the map data, while in other instances, there may be more than one possible match for a feature from drive data in another set of drive data or the map data with no indication as to which of the possible matches is correct. Consequently, the result may depend strongly on the selected correspondences, particularly in instances in which the total number of features in a region is relatively small. Thus, if the choice of the correspondences is incorrect, the resulting transformation may be similarly incorrect and may not, in fact, align the drive data with the other set of drive data or the map data. Additionally, the transformation may disadvantageously identify a local minimum as a result of the evaluation of the least squares error, as opposed to a global minimum, which would provide a more accurate result.

BRIEF SUMMARY

A method, apparatus and computer program product are provided in accordance with an example embodiment in order to localize data from at least one of two or more data sets based upon the registration of synthetic images representative of the two or more data sets. By registering the synthetic images, a positional difference between the two or more data sets may be corrected, thereby improving the localization of at least one of the two or more data sets. The improved localization may, in turn, facilitate, for example, the creation of more accurate maps and/or the more reliable detection of changes from a preexisting map.

In an example embodiment, a method is provided for localizing data from at least one of two or more data sets. The method includes creating a first synthetic image from a first data set and a second synthetic image from a second data set. The creation of the first and second synthetic images includes rasterizing representations of one or more features from the first and second data sets, respectively. The method also includes determining a transformation based upon a phase correlation between the first and second synthetic images. The transformation provides for improved localization of the data from at least one of the first or second data sets. The method further includes generating a report that defines the transformation.

The one or more features from the first and second data sets of an example embodiment may include one or more point features and one or more linear features. The method of this example embodiment creates the first and second synthetic images by representing the one or more features from the first and second data sets with corresponding synthetic features with the one or more point features and the one or more linear features as one or more dots and one or more polylines, respectively, in the first and second synthetic images. In this example embodiment, the first synthetic image is based upon drive data with the one or more point features representative of a sign or a pole and the one or more linear features representative of a lane marking or a road boundary. In addition, the second synthetic image may be based upon one of drive data or map data. In this example embodiment, the first synthetic image is created by sizing the one or more point features and the one or more linear features based upon a predefined level of accuracy of source data from the first data set.

The transformation is determined in accordance with an example embodiment by determining the transformation that maximizes the phase correlation between the first and second synthetic images. In an example embodiment, the method creates the first synthetic image by projecting the one or more features from the first data set onto a local tangent plane and rasterizing representations of the one or more features from the first and second data sets using respective positions of the one or more features projected from the first data set onto the local tangent plane to create one or more corresponding synthetic features in the first synthetic image. The method of an example embodiment also includes correcting a positional difference between the first and second data sets based upon the transformation.

In an example embodiment, the determination of the transformation includes generating first and second transformed images by applying a Fourier transform to the first and second synthetic images, respectively. In this example embodiment, the determination of the transformation also includes generating a product image based upon the first and second transformed images and generating an inverse image by applying an inverse Fourier transform to the product image. Further, the determination of the transformation in accordance with this example embodiment includes determining the transformation by identifying a pixel of the inverse image having a largest magnitude.

The method of an example embodiment determines the transformation by constraining the transformation to a maximum translation between the first and second synthetic images that is based upon a maximum error in absolute position of a vehicle that collected at least one of the first or second data sets that is to be corrected. In an example embodiment, the first synthetic image and the second synthetic image are created by creating the first synthetic image, the second synthetic image, or both to have a resolution that is dependent upon a predefined level of relative error between features from the first and second data sets. In another example embodiment, the first synthetic image and the second synthetic image are created by creating the first synthetic image, the second synthetic image, or both to have a resolution that is dependent upon a predefined level of accuracy of the transformation.

In another example embodiment, an apparatus is provided that is configured to localize data from at least one of two or more data sets. The apparatus includes processing circuitry and at least one non-transitory memory including computer program code instructions with the computer program code instructions configured to, when executed by the processing circuitry, cause the apparatus to create a first synthetic image from a first data set and a second synthetic image from a second data set. In this regard, the apparatus is caused to create the first and second synthetic images by rasterizing representations of one or more features from the first and second data sets, respectively. The computer program code instructions are also configured to, when executed by the processing circuitry, cause the apparatus to determine a transformation based upon a phase correlation between the first and second synthetic images. The transformation provides for improved localization of the data from at least one of the first or second data sets. The computer program code instructions are further configured to, when executed by the processing circuitry, cause the apparatus to generate a report that defines the transformation.

The one or more features from the first and second data sets of an example embodiment may include one or more point features and one or more linear features. The computer program code instructions are configured to, when executed by the processing circuitry, cause the apparatus of this example embodiment to create the first and second synthetic images by representing the one or more features from the first and second data sets with corresponding synthetic features with the one or more point features and the one or more linear features as one or more dots and one or more polylines, respectively, in the first and second synthetic images. In this example embodiment, the first synthetic image is based upon drive data with the one or more point features representative of a sign or a pole and the one or more linear features representative of a lane marking or a road boundary. In addition, the second synthetic image may be based upon one of drive data or map data. In this example embodiment, the first synthetic image is created by sizing the one or more point features and the one or more linear features based upon a predefined level of accuracy of source data from the first data set.

The computer program code instructions are configured to, when executed by the processing circuitry, cause the apparatus of an example embodiment to determine the transformation by determining the transformation that maximizes the phase correlation between the first and second synthetic images. In an example embodiment, the computer program code instructions are configured to, when executed by the processing circuitry, cause the apparatus to create the first synthetic image by projecting the one or more features from the first data set onto a local tangent plane and rasterizing representations of the one or more features from the first and second data sets using respective positions of the one or more features projected from the first data set onto the local tangent plane to create one or more corresponding synthetic features in the first synthetic image. The computer program code instructions are also configured to, when executed by the processing circuitry, cause the apparatus of an example embodiment to correct a positional difference between the first and second data sets based upon the transformation.

In an example embodiment, the computer program code instructions are configured to, when executed by the processing circuitry, cause the apparatus to determine the transformation by generating first and second transformed images by applying a Fourier transform to the first and second synthetic images, respectively, generating a product image based upon the first and second transformed images. Further, the computer program code instructions are also configured to, when executed by the processing circuitry, cause the apparatus of this example embodiment to determine the transformation by generating an inverse image by applying an inverse Fourier transform to the product image and identifying a pixel of the inverse image having a largest magnitude.

The computer program code instructions are configured to, when executed by the processing circuitry, cause the apparatus of an example embodiment to determine the transformation by constraining the transformation to a maximum translation between the first and second synthetic images that is based upon a maximum error in absolute position of a vehicle that collected at least one of the first or second data sets that is to be corrected. In an example embodiment, the first synthetic image and the second synthetic image are created by creating the first synthetic image, the second synthetic image, or both to have a resolution that is dependent upon a predefined level of relative error between features from the first and second data sets. In another example embodiment, the first synthetic image and the second synthetic image are created by creating the first synthetic image, the second synthetic image, or both to have a resolution that is dependent upon a predefined level of accuracy of the transformation.

In a further example embodiment, a computer program product is provided that is configured to localize data from at least one of two or more data sets. The computer program product includes at least one non-transitory computer-readable storage medium having computer-executable program code instructions stored therein with the computer-executable program code instructions configured to create a first synthetic image from a first data set and a second synthetic image from a second data set. In this regard, the first and second synthetic images are created by rasterizing representations of one or more features from the first and second data sets, respectively. The computer-executable program code instructions are also configured to determine a transformation based upon a phase correlation between the first and second synthetic images. The transformation provides for improved localization of the data from at least one of the first or second data sets. The computer-executable program code instructions are further configured to generate a report that defines the transformation.

The one or more features from the first and second data sets of an example embodiment may include one or more point features and one or more linear features. The computer-executable program code instructions configured to create the first and second synthetic images include computer-executable program code instructions configured to represent the one or more features from the first and second data sets with corresponding synthetic features with the one or more point features and the one or more linear features as one or more dots and one or more polylines, respectively, in the first and second synthetic images. In this example embodiment, the first synthetic image is based upon drive data with the one or more point features representative of a sign or a pole and the one or more linear features representative of a lane marking or a road boundary. In addition, the second synthetic image may be based upon one of drive data or map data. In this example embodiment, the first synthetic image is created by sizing the one or more point features and the one or more linear features based upon a predefined level of accuracy of source data from the first data set.

The computer-executable program code instructions of an example embodiment that are configured to determine the transformation include computer-executable program code instructions configured to determine the transformation that maximizes the phase correlation between the first and second synthetic images. In an example embodiment, the computer-executable program code instructions configured to create the first synthetic image include computer-executable program code instructions configured to project the one or more features from the first data set onto a local tangent plane and computer-executable program code instructions configured to rasterize representations of the one or more features from the first and second data sets using respective positions of the one or more features projected from the first data set onto the local tangent plane to create one or more corresponding synthetic features in the first synthetic image. The computer-executable program code instructions of an example embodiment are also configured to correct a positional difference between the first and second data sets based upon the transformation.

In an example embodiment, the computer-executable program code instructions configured to determine the transformation include computer-executable program code instructions configured to generate first and second transformed images by applying a Fourier transform to the first and second synthetic images, respectively, and computer-executable program code instructions configured to generate a product image based upon the first and second transformed images. In this example embodiment, the computer-executable program code instructions configured to determine the transformation also include computer-executable program code instructions configured to generate an inverse image by applying an inverse Fourier transform to the product image and computer-executable program code instructions configured to identify a pixel of the inverse image having a largest magnitude.

The computer-executable program code instructions of an example embodiment that are configured to determine the transformation include computer-executable program code instructions configured to constrain the transformation to a maximum translation between the first and second synthetic images that is based upon a maximum error in absolute position of a vehicle that collected at least one of the first or second data sets that is to be corrected. In an example embodiment, the first synthetic image and the second synthetic image are created by creating the first synthetic image, the second synthetic image, or both to have a resolution that is dependent upon a predefined level of relative error between features from the first and second data sets. In another example embodiment, the first synthetic image and the second synthetic image are created by creating the first synthetic image, the second synthetic image, or both to have a resolution that is dependent upon a predefined level of accuracy of the transformation.

In yet another example embodiment, an apparatus is provided for localizing data from at least one of two or more data sets. The apparatus includes means for creating a first synthetic image from a first data set and a second synthetic image from a second data set. The means for creating the first and second synthetic images includes means for rasterizing representations of one or more features from the first and second data sets, respectively. The apparatus also includes means for determining a transformation based upon a phase correlation between the first and second synthetic images. The transformation provides for improved localization of the data from at least one of the first or second data sets. The apparatus further includes means for generating a report that defines the transformation.

The one or more features from the first and second data sets of an example embodiment may include one or more point features and one or more linear features. In this example embodiment, the means for creating the first and second synthetic images includes means for representing the one or more features from the first and second data sets with corresponding synthetic features with the one or more point features and the one or more linear features as one or more dots and one or more polylines, respectively, in the first and second synthetic images. In this example embodiment, the first synthetic image is based upon drive data with the one or more point features representative of a sign or a pole and the one or more linear features representative of a lane marking or a road boundary. In addition, the second synthetic image may be based upon one of drive data or map data. In this example embodiment, the first synthetic image is created by sizing the one or more point features and the one or more linear features based upon a predefined level of accuracy of source data from the first data set.

In an example embodiment, the means for determining the transformation includes means for determining the transformation that maximizes the phase correlation between the first and second synthetic images. In an example embodiment, the means for creating the first synthetic image includes means for projecting the one or more features from the first data set onto a local tangent plane and means for rasterizing representations of the one or more features from the first and second data sets using respective positions of the one or more features projected from the first data set onto the local tangent plane to create one or more corresponding synthetic features in the first synthetic image. The apparatus of an example embodiment also includes means for correcting a positional difference between the first and second data sets based upon the transformation.

In an example embodiment, the means for determining the transformation includes means for generating first and second transformed images by applying a Fourier transform to the first and second synthetic images, respectively. In this example embodiment, the means for determining the transformation also includes means for generating a product image based upon the first and second transformed images and means for generating an inverse image by applying an inverse Fourier transform to the product image. Further, the means for determining the transformation in accordance with this example embodiment includes means for determining the transformation by identifying a pixel of the inverse image having a largest magnitude.

In an example embodiment, the means for determining the transformation includes means for constraining the transformation to a maximum translation between the first and second synthetic images that is based upon a maximum error in absolute position of a vehicle that collected at least one of the first or second data sets that is to be corrected. In an example embodiment, the first synthetic image and the second synthetic image are created by creating the first synthetic image, the second synthetic image, or both to have a resolution that is dependent upon a predefined level of relative error between features from the first and second data sets. In another example embodiment, the first synthetic image and the second synthetic image are created by creating the first synthetic image, the second synthetic image, or both to have a resolution that is dependent upon a predefined level of accuracy of the transformation.

BRIEF DESCRIPTION OF THE DRAWINGS

Figure 1:
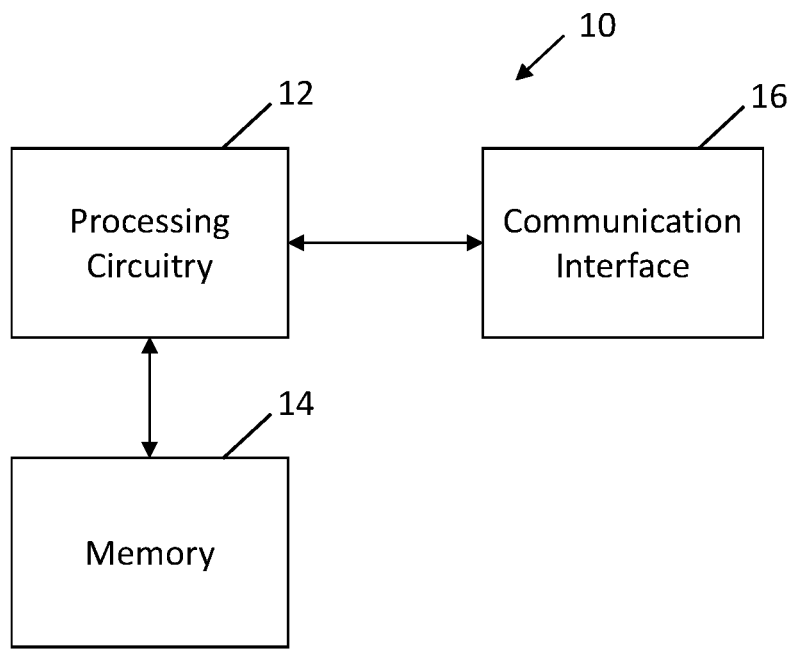
Figure 3:
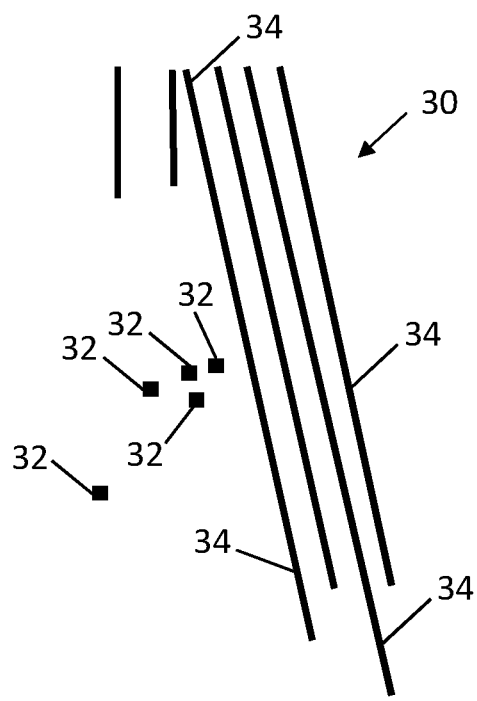
Figure 2:
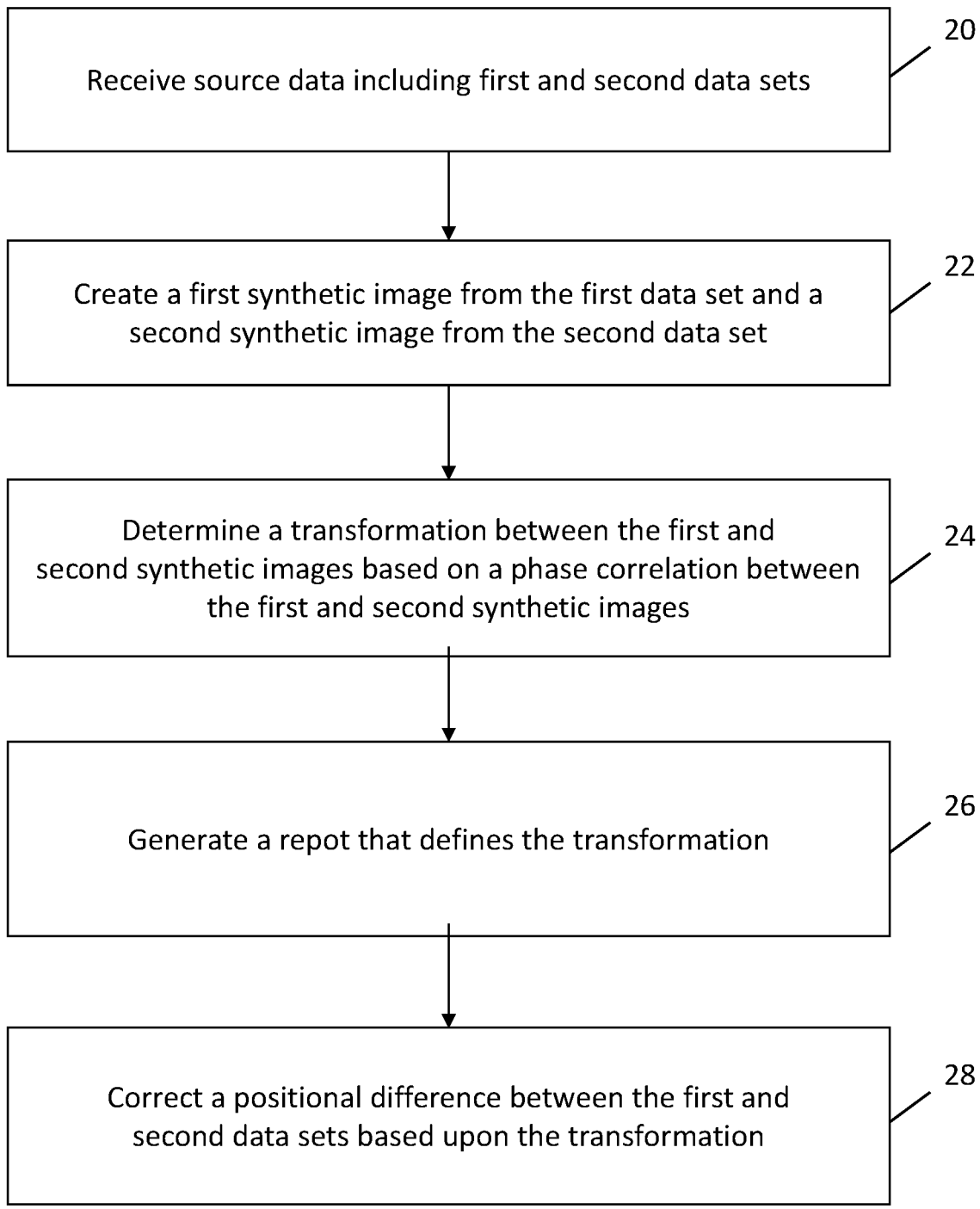
Figure 4:
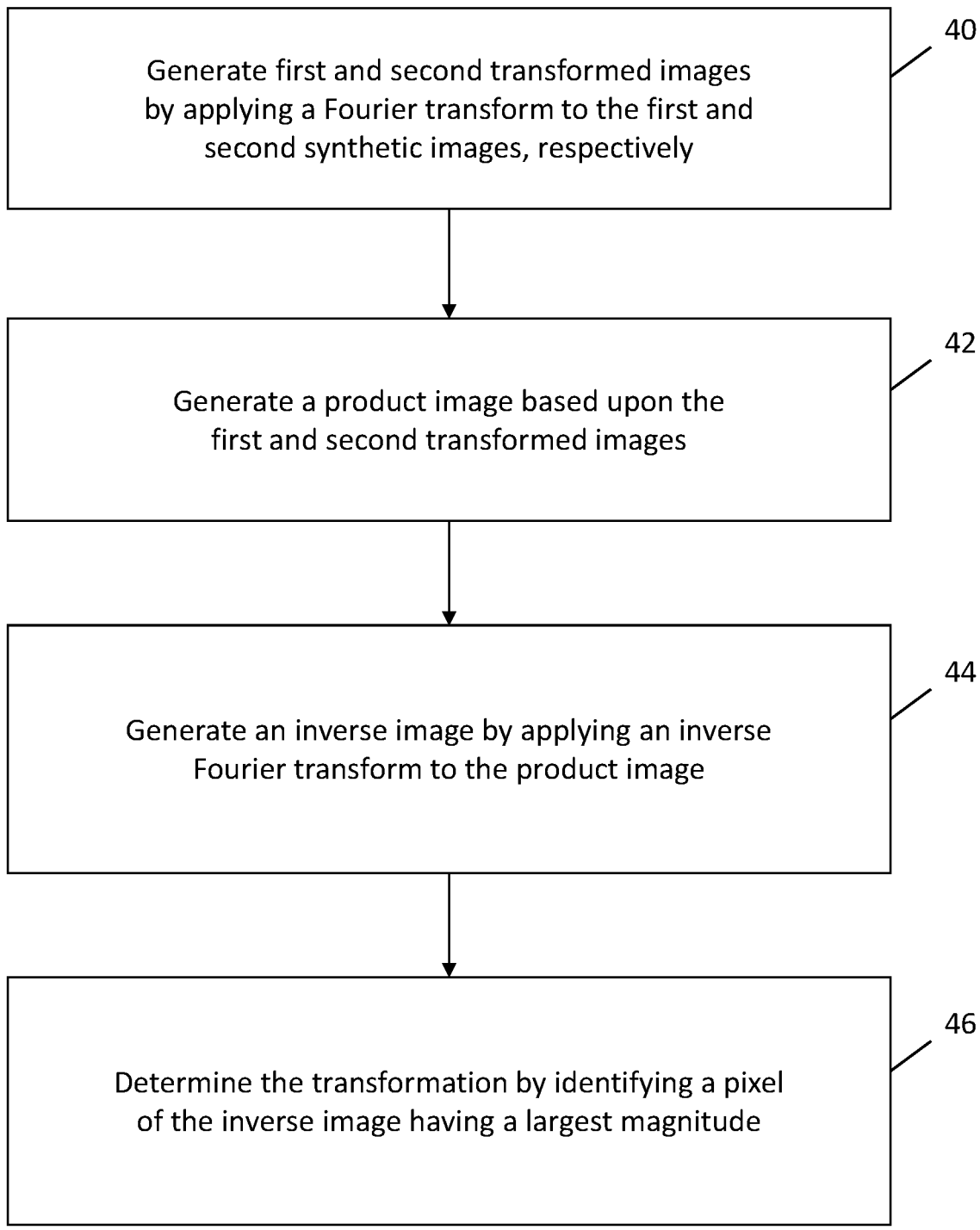

Having thus described certain embodiments of the disclosure in general terms, reference will now be made to the accompanying drawings, which are not necessarily drawn to scale, and wherein:

FIG. 1 is a block diagram of an apparatus that may be specifically configured in accordance with an example embodiment of the present disclosure;

FIG. 2 is a flow chart illustrating operations performed, such as by the apparatus of FIG. 1, in accordance with an example embodiment of the present disclosure;

FIG. 3 is an example of a synthetic image that may be registered in accordance with an example embodiment of the present disclosure; and FIG. 4 is a flow chart illustrating operations performed, such as by the apparatus of FIG. 1, in order to determine the transformation between first and second synthetic images in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to localize data from at least one of two or more data sets, such as based upon the registration of synthetic images representative of the two or more data sets. In this regard, a transformation may be determined from the registration of the synthetic images and the transformation may, in turn, provide for improved localization of the data from at least one of the two or more data sets. For example, a positional difference between the two or more data sets may be corrected based upon the transformation.

The synthetic images may be representative of any of a wide variety of subject matter. As described below by the way of example, but not of limitation, the synthetic images may be representative of drive data that, in turn, is representative of various features on or along a portion of a road network. These features may include point features, such as signs, posts or the like, as well as linear features, such as lane markings, road boundaries or the like. In this example embodiment, the improved localization provided by the method, apparatus and computer program product facilitate the creation of more accurate maps and/or the more reliable detection of changes from a preexisting map.

Regardless of the type of synthetic image, the apparatus for registering synthetic images may be embodied by any of a wide variety of computing devices including, for example, a server, a personal computer, a computer workstation, a plurality of network computers or the like. Notwithstanding the type of computing device that embodies the apparatus and as shown in FIG. 1, the apparatus 10 of an example embodiment includes, is associated with or is in communication with at least processing circuitry 12, a memory device 14 and a communication interface 16.

In some embodiments, the processing circuitry 12 (and/or co-processors or any other processors assisting or otherwise associated with the processing circuitry) may be in communication with the memory device 14 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 12 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 10 of an example embodiment may also include a communication interface 16 that may be any means such as a device or circuitry embodied in either hardware or a combination of hardware and software that is configured to receive and/or transmit data from/to other electronic devices in communication with the apparatus, such as a data source, a map provider or a database that provides the data, including map data, from which the synthetic images are created. The communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Referring now to FIG. 2, the operations performed, such as by the apparatus 10 of FIG. 1 are depicted. In this regard and as shown in block 20 of FIG. 2, the apparatus includes means, such as the processing circuitry 12, the communication interface 16 or the like, configured to receive source data defining a plurality of features. In an example embodiment in which the source data represents features on or along a portion of a road network, the source data that is received may be drive data that is derived from images captured by a camera on board a vehicle that is driving along a route through the portion of the road network and/or other data collected by and/or derived from data collected by one or more sensors on board the vehicle. Thus, the drive data is representative of features on or along the portion of the road network along which the vehicle drives including one or more point features, such as signs, posts or other discrete features that are located at a specific point and one or more linear features, such as lane markings, road boundaries or other elongate features that extend linearly, either in a straight line or a curved line. The drive data of an example embodiment identifies the location of each respective feature, such as in terms of latitude, longitude and optionally height. However, the drive data does not include the images captured by the camera on board the vehicle, but, rather, includes data derived from the images including data defining the features, such as being a point feature or a linear feature, and the respective locations of the features.

As shown in block 22 of FIG. 2, the apparatus 10 also includes means, such as the processing circuitry 12 or the like, configured to create a first synthetic image from a first data set and a second synthetic image from a second data set. In the embodiment in which source data is received that comprises the first and second data sets, the apparatus, such as the processing circuitry, is configured to create the first synthetic image based upon the source data. In an example embodiment in which the source data from which the first synthetic image is created is drive data, the source data will not generally include the images captured by the camera onboard the vehicle, but is, instead, derived from the images such that the apparatus, such as the processing circuitry, of this example embodiment is configured to create the first synthetic image without access to the imagery from which the source data is derived.

In the foregoing embodiment in which the first synthetic image is created from drive data, the second synthetic image may also be created from drive data. In this example embodiment, the drive data from which the second synthetic image is created is drive data collected by a vehicle travelling along the same road segment in the same direction as the vehicle that collected the drive data from which the first synthetic image was created. Based upon this drive data, the second synthetic image may be created, such as by the apparatus 10 and, more particularly, by the processing circuitry 12. Alternatively, the second synthetic image may be based upon map data. In this regard, the source data from which the second synthetic image is created may be map data of the same portion of the road network along which the vehicle drove when collecting the drive data from which the first synthetic image was created.

The synthetic image may be created in various manners. In an example embodiment, the apparatus 10, such as the processing circuitry 12, is configured to create the synthetic image by projecting one or more features from the respective data set onto a Euclidean plane, such as a local tangent plane at the locations identified by the drive data for the respective features, such as in terms of latitude, longitude and optionally height. The apparatus, such as the processing circuitry, of this example embodiment is also configured to rasterize the representations of the one or more features from the respective data set following projection onto the local tangent plane by using respective positions of the one or more features projected from the first data set onto the local tangent plane to create one or more corresponding synthetic features in the resulting monochromatic synthetic image.

As noted above, the first and second data sets from which the first and second synthetic images, respectively, are created each include one or more features, such as one or more point features and one or more linear features. Relative to a point feature defined by the source data, the resulting synthetic image includes a corresponding synthetic point feature having the same relative position and represented by a dot comprised of one or more pixels in a predefined geometrical shape, such as a circular shape, a square shape or the like. The size of the synthetic point feature may also be predefined such as in terms of a predefined number of pixels. For example, a circularly shaped point feature may have a diameter of a predefined length, while a square shaped point feature may have a predefined side length. In some embodiments, however, different types of point features may be included in the source data and represented with corresponding synthetic point features by the synthetic image. The different types of point features may be represented in the synthetic image by synthetic point features having different sizes and, as such, each different type of synthetic point feature of this example embodiment may have a predefined size which may differ from the predefined size of other types of synthetic point features. For example, the synthetic point feature representative of a light pole may have a different predefined size than the synthetic point feature representative of a much larger billboard. In terms of a linear feature, the synthetic image is configured to represent the linear feature as a synthetic linear feature, such as a polyline comprised of a rasterized line of pixels. The width of the rasterized line of pixels may be predefined, such as in terms of a predefined number of pixels in the widthwise direction of the rasterized line.

An example embodiment of a synthetic image 30, such as a first synthetic image or a second synthetic image, is depicted in FIG. 3. As shown, the synthetic image of FIG. 3 includes 5 distinct synthetic point features 32, such as may be representative of signs, post or the like. In addition, the synthetic image of FIG. 3 includes 4 parallel synthetic linear features 34. In this regard, the outer two synthetic linear features may represent the road boundaries on the opposite sides of a road segment and the two interior synthetic linear features may represent the line markings dividing the road segment into three lanes, such as two outer lanes with traffic going in opposite directions and a center turn lane.

Although the size of the synthetic point features and the size of the synthetic linear features in the synthetic image, such as the first synthetic image and/or the second synthetic image, may be predefined, the apparatus 10, such as the processing circuitry 12, of another example embodiment may be configured to size a synthetic point feature and/or size a synthetic linear feature based upon the predefined level of accuracy of the source data. In this example embodiment, the apparatus, such as the processing circuitry, is configured to size the synthetic point feature and/or size the synthetic linear feature such that the synthetic features of the synthetic image have a size that varies inversely with the level of accuracy of the source data. Thus, as the accuracy of the source data increases, the corresponding sizes of the synthetic features depicted by the synthetic image are reduced. Conversely, as the accuracy of the source data decreases, the corresponding sizes of the synthetic features depicted by the synthetic image are increased Additionally, the pixel value may be used to encode other properties of the point features or linear features. In one example embodiment, the pixel value encodes the type of feature, so that signs are represented by one value and poles by a different value. In another example embodiment, the pixel value encodes a confidence value of the feature being represented.

The synthetic image, such as the first synthetic image and/or the second synthetic image, may be created so as to have a predefined resolution. In other embodiments, however, the apparatus 10, such as the processing circuitry 12, is configured to create the synthetic image to have a resolution that depends upon a predefined level of relative error between features defined by the source data that are represented by the synthetic image. In this embodiment, the resolution of the synthetic image that is created may also be independent of an error that is applicable to all features defined by the source data that are represented by the synthetic image. As noted above, the drive data upon which a synthetic image may be created generally has a relatively small relative error between the various features defined by the drive data since the location of the various features relative to the vehicle that captured the images from which the features were identified is relatively accurate. In contrast, the error associated with the position of the vehicle relative to the road segment and, in turn, the error associated with differences in the location of all of the features identified by the drive data relative to the road segment along which the vehicle was driving is more substantial and may, for example, approximate the inaccuracy associated with a location derived from GPS signals, such as on the order of one or several meters. In this example embodiment, the resolution of the synthetic image that is created is not dependent upon the error that is uniformly applicable to all features identified by the drive data and, as a result, the resolution is not dependent on GPS error or errors associated with the determination of the location of the vehicle that carries the camera since such errors are equally applicable to all of the features of the synthetic image. Instead, the resolution of the synthetic image created in accordance with this example embodiment is dependent upon the relative error between features identified by the drive data.

In this example embodiment, the apparatus 10, such as the processing circuitry 12, is configured to create the synthetic image, such as the first synthetic image and/or the second synthetic image, with a resolution that varies inversely with the relative error between features identified by the source data from which the synthetic image is created. Thus, as the relative error between features identified by the source data increases, the resolution of the synthetic image is reduced. Conversely, as the relative error between features identified by the source data decreases, the resolution of the synthetic image is increased.

Referring now to block 24 of FIG. 2, the apparatus 10 also includes means, such as the processing circuitry 12 or the like, configured to determine a transformation between first and second synthetic images based upon a phase correlation between the first and second synthetic images. In this regard, the apparatus, such as the processing circuitry, is configured to determine the transformation that maximizes the phase correlation between the first and second synthetic images.

In an example embodiment, the apparatus 10, such as the processing circuitry 12, is configured to determine the phase correlation between the first and second synthetic images in the manner set forth by FIG. 4. As shown in block 40 of FIG. 4, the apparatus includes means, such as the processing circuitry or the like, configured to generate first and second transformed images by applying a Fourier transform to the first and second synthetic images, respectively. In an example embodiment, the apparatus, such as the processing circuitry, may be configured to determine the complex fast Fourier transform in two dimensions of the first synthetic image and to also determine the complex fast Fourier in two dimensions of the second synthetic image. As shown in block 42, the apparatus also includes means, such as the processing circuitry or the like, configured to generate a product image based upon the first and second transformed images, such as by multiplying the transform of the first synthetic image on an element-wise basis with the complex conjugate of the transform of the second synthetic image.

In one embodiment, the apparatus 10, such as the processing circuitry 12, is then further configured to normalize the resulting product on an element-wise basis, by dividing each element by its complex norm, so that in the normalized product image each element has a norm equal to unity. As an alternative to the normalization of the resulting product, the apparatus, such as the processing circuitry, may be configured to filter the resulting product so as to thereafter utilize only those frequencies for which the signal has a magnitude that satisfies a predefined threshold, such as by being above the predefined threshold, and to discard or otherwise forgo further consideration of those frequencies for which the signal has a magnitude that fails to satisfy the predefined threshold, such as by being below the predefined threshold. In one example embodiment, the threshold is a predefined fraction of the magnitude of the largest element of the product image.

Thereafter, as shown in block 44 of FIG. 4, the apparatus 10 of this example embodiment includes means, such as the processing circuitry 12 or the like, configured to generate an inverse image by applying an inverse Fourier transform to the product image. For example, the apparatus, such as the processing circuitry, may be configured to determine the inverse fast Fourier transform of the resulting product, following normalization or filtering. Although the original synthetic images are real valued, the transformed images, the product image and the inverse image ae complex-valued.

From the inverse of the fast Fourier transform of the resulting product, the apparatus 10 includes means, such as the processing circuitry 12 or the like, configured to determine the transformation by identifying a pixel of the inverse image having a largest magnitude, that is, the maximum absolute value, as shown in block 46 of FIG. 4. This pixel and, as described below, the location of this pixel corresponds to the optimal transform of one synthetic image to the other synthetic image in order to provide for the greatest correlation between features identified by the source data from which the synthetic images were created. By way of example, the location of the pixel having the largest magnitude may have coordinates in the x and y directions relative to a predefined origin of the inverse image designated (0,0) that defines the translation in the x and y directions between the first and second synthetic images that is required to obtain greatest correlation between the first and second synthetic images. For example, in an instance in which the second synthetic image is translated by two pixels in the x direction and three pixels in the y direction from the first synthetic image, the phase correlation algorithm will result in a pixel having a maximum absolute value at a located defined by the coordinates (2, 3).

As described above, the features identified by the source data from which the synthetic images are created are generally localized to a substantial extent with there being a relatively small relative error between the locations of the features identified by the source data. Rather, the majority of the error associated with the location of the features identified by the source data is a common absolute error applicable to all of the features, such as due to an error associated with the location the vehicle carrying the camera that captured the images from which the features were identified as opposed to errors associated with the relative location of the features with respect to the vehicle carrying the camera. Since a limit on this common absolute error associated with all features may be known a priori, the apparatus 10 of this example embodiment, such as the processing circuitry 12, may be configured to constrain the transformation between the first and second synthetic images to a maximum translation that is based upon a maximum error in the absolute position of the vehicle that collected at least one of the first or second data set that is to be corrected. In this example embodiment, the maximum translation to which the transformation is constrained varies directly with the maximum error in the absolute position of the vehicle. Thus, as the maximum absolute error of the source data increases, the maximum translation to which the transformation is constrained also correspondingly increases. Conversely, as the maximum absolute error of the source data decreases, the maximum translation to which the transformation is constrained also correspondingly decreases.

Thus, in an instance in which the maximum error in absolute position of a vehicle that collected at least one of the first or second data sets that is to be corrected is small as a result of a small absolute error of the source data, e.g., the first or second data set, the apparatus 10, such as the processing circuitry 12, is configured to constrain the transformation to a correspondingly small maximum translation between the first and second synthetic images. As a result of this constraint, the processing resources required to determine the transformation are conserved and the speed with which the transformation is determined is increased.

As shown in block 26 of FIG. 2, the apparatus 10 of this example embodiment also includes means, such as the processing circuitry 12 or the like, is configured to generate a report that defines the transformation. The apparatus of this example embodiment also includes means, such as the processing circuitry or the like, configured to correct a positional difference between the first and second data sets based upon the transformation, such as in response to receipt of the report. See block 28 of FIG. 2. In regard to the correction of the positional difference, the locations of the features identified by the source data and represented by corresponding synthetic features of a synthetic image are repositioned, thereby improving the accuracy and decreasing the error with which features are located in the source data. As the errors in the locations of the features identified by the source data from which the synthetic image is created are correlated to one another, the correction in the positional difference between the first and second data sets from which the first and second synthetic images, respectively, are created and the resulting improvement in the localization of the features brought about by the correction in the positional difference between the first and second data sets can correspondingly reduce the error in the location of a feature that was previously unseen and, as a result, was not included in prior sets of drive data.

In this regard, the apparatus 10, such as the processing circuitry 12, of an example embodiment is configured to correct the positional difference between the first and second data sets by translating at least one of the first and second data sets based upon a conversion of the transformation that is determined from pixels in the synthetic images to one or more of a distance measurement or latitude or longitude coordinates relative to the source data. As described above, the coordinate position of the pixel having the largest magnitude in the resulting product of the inverse fast Fourier transform identifies the pixels in the x and y directions that must be translated between the first and second synthetic images in order to provide for the maximum correlation therebetween. In the example described above, the location of the pixel having the greatest amplitude from the resulting product of the inverse fast Fourier transform was located at (2, 3) which correlated to a translation of two pixels in the x direction and three pixels in the y direction between the first and second synthetic images in order to provide for the greatest correlation between the first and second synthetic images. Based upon a conversion between the size of a pixel in a synthetic image and the dimensions represented by the source data from which the synthetic image was created, this translation between the first and second synthetic images may be translated into terms of distance, such as in terms of meters, or in terms of latitude and/or longitude coordinates, to permit the locations of the features in the first data set and/or the second data set to be correspondingly modified.

The correction of the positional differences between the first and second data sets may involve the correction of the location of features identified by only one data set, namely, the first data set from which the first synthetic image was created. For example, in an instance in which the second synthetic image is created based upon map data, the apparatus 10, such as the processing circuitry 12, is configured to correct the location of features identified by only the first data set from which the first synthetic image was created, since the location of the map data is fixed. In an embodiment in which the second synthetic image is, instead, based upon drive data, however, the apparatus, such as the processing circuitry, may again be configured to correct the location of features identified by only one data set, namely, the first data set from which the first synthetic image was created. In other embodiments, however, the apparatus, such as the processing circuitry, is configured to correct the location of features identified by both the first and second data sets from which the first and second synthetic images were created such that the total amount of the correction in the positional difference of a respective feature is provided in combination or in the aggregate by the correction in the location of same respective feature identified by both of the first and second data sets.

In this regard, the apparatus 10, such as the processing circuitry 12, of this example embodiment is configured to apply the correction in positional difference between the first and second data sets in opposite directions such that the total correction corresponds to the translation between the first and second synthetic images that is determined based upon the transformation. For example, in an instance in which the translation between the first and second images is to be two pixels in the x direction and three pixels in the y direction, the location of the features identified by the first data set may be translated by −1 pixel in the x direction and −1.5 pixel in the y direction and the features identified by the second data set may be translated by +1 pixel in the x direction and +1.5 pixel in the y direction such that the total translation between the first and second data sets is two pixels in the x direction and three pixels in the y direction. Although different amounts of correction may be applied to both the first and second data sets, the apparatus, such as the processing circuitry, of an example embodiment is configured to apply the correction in equal amounts but in opposite directions to both the first and second data sets such that the average correction in positional differences of the first and second data sets is zero.

In some embodiments, first and second data sets are divided into tiles and each tile is separately and independently processed as described above. In some embodiments in which the separate processing of each tile generates different results, e.g., different corrections of positional differences, for adjacent tiles, the apparatus 10, such as the processing circuitry 12, may be configured to enforce continuity between tiles, such as by means of the application of a Kalman filter, a Viterbi algorithm or the like.

As described above and as shown in FIG. 3, the first and second synthetic images may be two-dimensional images. In other embodiments, however, the first and second synthetic image may be three-dimensional images. In this situation, the apparatus, such as the processing circuitry, may be configured to determine the transformation in each of the three-dimensions, such as by utilizing a three-dimensional fast Fourier transform. Additionally, in the embodiment described above, the determination of the transformation between the first and second synthetic images did not take into account differences in the rotation and scale factor between the synthetic images. As rotational differences and differences in scale factors are generally quite small with respect to drive data, the determination of a transformation without consideration of rotation and scale factor is generally appropriate for the analysis of drive data. However, either in conjunction with analysis of drive data or in another context, the apparatus 10, such as the processing circuitry, may also be configured to determine the transformation in rotation and/or in scale factors, such as by applying the fast Fourier transform to first and second synthetic images in log-polar coordinates as oppose to x and y coordinates. Additionally, in the embodiment described above, the determination of the transformation to be applied between the first and second data sets was constrained to be a translation by a whole number of pixels in each of the x and y coordinates based on the pixel in the inverse image with the greatest magnitude. In other embodiments, the apparatus 10, such as the processing circuitry, may also be configured to apply an interpolation algorithm such as parabolic interpolation to a set of pixels in the inverse image near the pixel with the greatest magnitude, and to find the maximum value based on this interpolation corresponding to a fractional pixel position, thereby providing for sub-pixel resolution.

As described above, a method, apparatus 10 and computer program product are provided in order to improve the localization of features identified by two or more data sets based upon a registration of synthetic images created from respective data sets. In this regard, synthetic images are registered by determining a transformation between the synthetic images so that the correlation between the synthetic images is more accurately defined. As a result, features identified by the data sets from which the synthetic images are created may be more accurately matched in order to permit for example, the creation of more accurate maps and/or the more reliable detection of changes from a pre-existing map. Additionally, the method, apparatus and computer program product are configured to determine the transformation, such as the optimal transformation, between the synthetic images in a single iteration, thereby conserving processing resources and time.

As described above, the method, apparatus 10 and computer program product consider all features of the source data together and do not depend on the determination of correspondences between specific pairs of features identified by the first and second data sets. Thus, the method, apparatus and computer program product of an example embodiment may provide enhanced accuracy by avoiding errors attributable to the determination of incorrect correspondences.

FIGS. 2 and 4 are flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for localizing data from at least one of two or more data sets, the method comprising:
   creating a first synthetic image from a first data set and a second synthetic image from a second data set, wherein creating the first and second synthetic images comprises projecting one or more features from the first and second data sets, respectively, onto a local tangent plane and rasterizing representations of the one or more features from the first and second data sets, respectively, by using respective positions of the one or more features projected from the first and second data sets onto the local tangent plane to create one or more corresponding synthetic features in the first and second synthetic images;
   determining a transformation based upon a phase correlation between the first and second synthetic images, wherein the transformation provides for improved localization of the data from at least one of the first or second data sets; and
   generating a report that defines the transformation.

2. A method according to claim 1 wherein the one or more features from the first and second data sets comprise one or more point features and one or more linear features, and wherein creating the first and second synthetic images comprises representing the one or more features from the first and second data sets with corresponding synthetic features with the one or more point features and the one or more linear features as one or more dots and one or more polylines, respectively, in the first and second synthetic images.

3. A method according to claim 2 wherein the first synthetic image is based upon drive data with the one or more point features representative of a sign or a pole and the one or more linear features representative of a lane marking or a road boundary, and wherein the second synthetic image is based upon one of drive data or map data.

4. A method according to claim 2 wherein creating the first synthetic image comprises sizing the one or more point features and the one or more linear features based upon a predefined level of accuracy of source data from the first data set.

5. A method according to claim 1 wherein determining the transformation comprises determining the transformation that maximizes the phase correlation between the first and second synthetic images.

6. A method according to claim 1 wherein determining the transformation comprises:
   generating first and second transformed images by applying a Fourier transform to the first and second synthetic images, respectively;
   generating a product image based upon the first and second transformed images;
   generating an inverse image by applying an inverse Fourier transform to the product image; and
   determining the transformation by identifying a pixel of the inverse image having a largest magnitude.

7. A method according to claim 1 further comprising correcting a positional difference between the first and second data sets based upon the transformation.

8. A method according to claim 1 wherein determining the transformation comprises constraining the transformation to a maximum translation between the first and second synthetic images that is based upon a maximum error in absolute position of a vehicle that collected at least one of the first or second data sets that is to be corrected.

9. A method according to claim 1 wherein creating the first synthetic image and the second synthetic image comprises creating the first synthetic image, the second synthetic image, or both to have a resolution that is dependent upon a predefined level of relative error between features from the first and second data sets.

10. A method according to claim 1 wherein creating the first synthetic image and the second synthetic image comprises creating the first synthetic image, the second synthetic image, or both to have a resolution that is dependent upon a predefined level of accuracy of the transformation.

11. An apparatus configured to localize data from at least one of two or more data sets, the apparatus comprising processing circuitry and at least one non-transitory memory including computer program code instructions, the computer program code instructions configured to, when executed by the processing circuitry, cause the apparatus to:

create a first synthetic image from a first data set and a second synthetic image from a second data set, wherein the apparatus is caused to create the first and second synthetic images by projecting one or more features from the first and second data sets, respectively, onto a local tangent plane and rasterizing representations of the one or more features from the first and second data sets, respectively, by using respective positions of the one or more features projected from the first and second data sets onto the local tangent plane to create one or more corresponding synthetic features in the first and second synthetic images;

determine a transformation based upon a phase correlation between the first and second synthetic images, wherein the transformation provides for improved localization of the data from at least one of the first or second data sets; and generate a report that defines the transformation.

12. An apparatus according to claim 11 wherein the one or more features from the first and second data sets comprise one or more point features and one or more linear features, and wherein the apparatus is caused to create the first and second synthetic images by representing the one or more features from the first and second data sets with corresponding synthetic features with the one or more point features and the one or more linear features as one or more dots and one or more polylines, respectively, in the first and second synthetic images.

13. An apparatus according to claim 11 wherein the apparatus is caused to determine the transformation by determining the transformation that maximizes the phase correlation between the first and second synthetic images.

14. An apparatus according to claim 11 wherein the apparatus is caused to determine the transformation by:

generating first and second transformed images by applying a Fourier transform to the first and second synthetic images, respectively;

generating a product image based upon the first and second transformed images;

generating an inverse image by applying an inverse Fourier transform to the product image; and determining the transformation by identifying a pixel of the inverse image having a largest magnitude.

15. An apparatus according to claim 11 the apparatus is further caused to correct a positional difference between the first and second data sets based upon the transformation.

16. An apparatus according to claim 11 wherein the apparatus is caused to determine the transformation by constraining the transformation to a maximum translation between the first and second synthetic images that is based upon a maximum error in absolute position of a vehicle that collected at least one of the first or second data sets that is to be corrected.

17. A computer program product for localizing data from at least one of two or more data sets, the computer program product comprising at least one non-transitory computer-readable storage medium having computer-executable program code instructions stored therein, the computer-executable program code instructions configured to:

create a first synthetic image from a first data set and a second synthetic image from a second data set, wherein the computer-executable program code instructions configured to create the first and second synthetic images comprise computer-executable program code instructions configured to project one or more features from the first and second data sets, respectively, onto a local tangent plane and to rasterize representations of the one or more features from the first and second data sets, respectively, by using respective positions of the one or more features projected from the first and second data sets onto the local tangent plane to create one or more corresponding synthetic features in the first and second synthetic images;

determine a transformation based upon a phase correlation between the first and second synthetic images, wherein the transformation provides for improved localization of the data from at least one of the first or second data sets; and generate a report that defines the transformation.

18. A computer program product according to claim 17 wherein the one or more features from the first and second data sets comprise one or more point features and one or more linear features, and wherein the computer-executable program code instructions configured to create the first and second synthetic images comprise computer-executable program code instructions configured to represent the one or more features from the first and second data sets with corresponding synthetic features with the one or more point features and the one or more linear features as one or more dots and one or more polylines, respectively, in the first and second synthetic images.

* * * * *